(12) United States Patent
Watschke

(10) Patent No.: US 9,003,702 B1
(45) Date of Patent: Apr. 14, 2015

(54) FOLIAR APPLICATION OF NUTRIENTS TO VEGETATION

(76) Inventor: Thomas Lee Watschke, State College, PA (US)

(*) Notice: Subject to any disclaimer, the term of this patent is extended or adjusted under 35 U.S.C. 154(b) by 0 days.

(21) Appl. No.: 13/556,772

(22) Filed: Jul. 24, 2012

Related U.S. Application Data

(60) Provisional application No. 61/512,211, filed on Jul. 27, 2011.

(51) Int. Cl.
*A01G 7/00* (2006.01)
*A01G 13/00* (2006.01)
*C05B 13/06* (2006.01)

(52) U.S. Cl.
CPC ...................................... *C05B 13/06* (2013.01)

(58) Field of Classification Search
CPC ......... A01G 7/00; A01G 1/00; A01G 13/004; A01G 25/00; A01G 25/14
USPC ................................ 47/58.1 FV, 58.1 R, 57.7
See application file for complete search history.

(56) References Cited

U.S. PATENT DOCUMENTS

| | | | | |
|---|---|---|---|---|
| 2,768,095 A * | 10/1956 | Tadema et al. | ..................... | 427/4 |
| 2,770,538 A * | 11/1956 | Vierling | ............................ | 71/29 |
| 2,869,998 A * | 1/1959 | Vierling | ............................ | 71/50 |
| 3,131,154 A * | 4/1964 | Klausner | ........................ | 516/19 |
| 3,356,482 A * | 12/1967 | Ogle et al. | ........................ | 71/11 |
| 3,387,405 A * | 6/1968 | Iwasky et al. | ....................... | 47/9 |
| 3,812,619 A * | 5/1974 | Wood et al. | ............... | 47/58.1 R |
| 4,030,244 A * | 6/1977 | Tennes et al. | .................... | 47/1.7 |
| 2012/0149570 A1 * | 6/2012 | Burke et al. | .................. | 504/117 |

\* cited by examiner

*Primary Examiner* — Monica Williams
(74) *Attorney, Agent, or Firm* — Duane Morris LLP

(57) ABSTRACT

The present invention provides a system and method to accurately and safely allow the application of nutritional elements to the foliage of vegetation. The accuracy and safety are the result of the nutritional elements being pre-mixed and applied via a pressurized canister, which produces a foam-based delivery system. The foam is highly visible, dissipates rapidly, and is inert except for the nutrients which it contains (e.g., nitrogen, phosphorus, potassium, magnesium, calcium, and others including all of the micro-nutrients that are essential for plant growth). The nutrient content of the foam, for specific uses of the invention, is necessarily variable depending on the type and condition of the vegetation needing such an application.

6 Claims, 2 Drawing Sheets

FOLIAR APPLICATION OF NUTRIENTS TO VEGETATION

CROSS REFERENCE TO RELATED APPLICATION

This application claims the benefit of U.S. Provisional Application No. 61/512,211 filed Jul. 27, 2011.

FIELD OF THE INVENTION

The present invention relates to the accurate and safe application of nutritional elements to the foliage of vegetation. The accuracy and safety are the result of the nutritional elements being pre-mixed and applied via a pressurized canister, which produces a foam based delivery system.

BACKGROUND OF THE INVENTION

In current practice, the foliar application of nutrients to vegetation is performed using back-pack type sprayers or hose-end "proportioners." While these methods are useful, they do not allow the applicator to precisely make the application (e.g., typical directions for use instruct application until the liquid material is "running off" the foliage). Since such clear liquid applications are difficult to observe until they do run off, some of the product will miss the intended target (i.e., the foliage), which makes the foliar uptake less precise and introduces the nutrients to the soil (where the nutrients can become unavailable to the plant and potentially contribute to off-site movement). Essentially, the foam delivery system is a method whereby the applicator (by eye contact) is able to confirm that the material is being applied to the proper location and that uptake is maximized and losses are minimized.

Old methods require mixing of the materials prior to application. They require that the applicator make decisions about the delivery that are highly subjective and lack precision.

U.S. Pat. No. 6,642,179, incorporated herein by reference, relates to the use of a composition including the compound 5-acetamido-2,4-dimethyltrifluoromethanesulfonanilide in spray foam form, as well as horticulturally acceptable salts thereof, certain intermediates therefor and processes for the preparation thereof. The compound is useful as a herbicide and plant growth modifier.

It was an object of that invention to provide a composition including the compound 5-acetamido-2,4-dimethyltrifluoromethanesulfonanilide and its horticulturally acceptable salts in spray foam form, suitable for homeowner and industrial use. The present invention introduces a further aspect to the application of nutrients to foliar vegetation, as described herein.

SUMMARY OF THE INVENTION

The present invention relates to a method to accurately and safely allow for the application of nutritional elements to the foliage of vegetation. The accuracy and safety are the result of the nutritional elements being pre-mixed and applied via a pressurized canister, which produces a foam-based delivery system. The foam is highly visible, dissipates rapidly, and is inert except for the nutrients which it contains (e.g., nitrogen, phosphorus, potassium, magnesium, calcium, and other nutrients including all of the micro-nutrients that are essential for plant growth). The nutrient content of the foam, for specific uses of the invention, is necessarily variable depending on the type and condition of the vegetation needing such an application.

DETAILED DESCRIPTION OF THE INVENTION

The advantages of the present invention, as outlined above, are that it allows an applicator to be more precise in application, while enjoying improved safety (due to, e.g., no mixing requirements), and providing for a highly visible application method which improves delivery to the target. In addition, there will be an improved efficiency for the target vegetation, in terms of nutrient uptake and utilization.

In a preferred embodiment, the present invention relates to a method for applying nutritional elements to foliage of vegetation, comprising: a) pre-mixing the nutritional elements to be applied to the foliage; and b) applying said mixed nutritional elements to the foliage via a pressurized canister, producing a foam based delivery system, wherein the foam consistency is in an amount effective for high visibility, maximum adherence to foliage (e.g., leaves), and rapid dissipation.

In accordance with the present invention, a marked improvement is achieved in terms of the capability of non-professional and professional applicators of foliar fertilizers to deliver nutrients to vegetation with increased accuracy and safety, while simultaneously improving the utilization by the plant of the nutrients being applied.

The most efficacious results will be achieved by contracting with the most competent canning facility, so as to provide the best foam consistency, dissipation rate, filling capacity, and service back-up needed to provide a quality product to the end user.

In accordance with the present invention, typical directions for liquid applications are to apply until "drip off" is noticeable, which is clearly subjective and highly variable. The foam application approach of the present invention allows for the user to accurately observe where and how much material has been applied. By inference, such an application method would be more efficient and more efficacious.

The preferred materials to be used are comprised of various nutrient packages specifically designed for a particular vegetative target (e.g., flowers, turf, vegetables, etc.). The foam consistency is prepared so that (1) it is white (thus being visible even to people that suffer from visual impairments, e.g., color blindness); (2) it is thick enough so that it adheres to leaves without dripping off; and (3) it dissipates in about four to five seconds. This rate of dissipation allows for the liquid to evaporate rapidly and become absorbed through the epidermis of the plant cells by diffusion. Also, being a foam, the materials would have less propensity to drift when applied under breezy conditions, and, because the application of materials is so visible, if drifting is observed, the user can stop applying to avoid any off target movement.

Figure 1:
FIG. 1 is a photograph of a liquid pack-type application to foliar vegetation.
Figure 2:
FIG. 2 is a photograph of a foam application to foliar vegetation, in accordance with the present invention.

The attached photographs (FIGS. 1 and 2) address the differences between a foam application (FIG. 2) and a typical liquid pack type of application that homeowners normally use (FIG. 1). The visual foam is an apparent difference and allows for more accurate and calibrated delivery of product.

The thickness of the foam is determined by the desired speed at which it disappears and for no other practical reason other than visibility.

The foam does not provide a quantifiable difference in growth rate compared to liquid applications (i.e., it takes large differences in order to be statistically significant from a research perspective). However, the materials incorporated into the foam do enhance overall plant health, which is not necessarily reflected in increased growth (i.e., it is more related to stress tolerance and tolerance to various environmental conditions).

In a particularly preferred embodiment, the components of the present invention represent a 1-1-1 ratio of N, $P_2O_5$, and K as macronutrients, an array of micronutrients, other additives. For instance, other additives may include vitamins, bio-stimulants and micronutrient packages, which are targeted for use on putting greens that are built using highly modified soil mixtures that are predominately sand.

While the present invention has been described with respect to particular embodiments thereof, it is apparent that numerous other forms and modifications of the invention will be obvious to those skilled in the art. The appended claims and the present invention generally should be construed to cover all such obvious forms and modifications which are within the true spirit and scope of the present invention.

What is claimed is:

1. A method for applying nutritional elements to foliage of vegetation and enhancing plant health, consisting of:
   a) pre mixing the nutritional elements to be applied to the foliage; and
   b) applying said pre-mixed nutritional elements to the foliage with minimized runoff via a pressurized canister, producing a foam based delivery system;
   wherein foam consistency is in an amount effective for high visibility, maximum adherence to foliage, and rapid dissipation, and the applying of said mixed nutritional elements to the foliage enhances the stress tolerance and overall health of the vegetation, the nutritional elements consisting of nitrogen, phosphorus, potassium, micronutrients, vitamins and bio-stimulants, the foam being inert except for the nutritional elements incorporated therein.

2. The method as recited in claim 1, wherein the foam consistency is prepared so that said foam is white in color.

3. The method as recited in claim 1, wherein the weight ratio of nitrogen-phosphorus-potassium is about 1-1-1.

4. The method as recited in claim 1, wherein said foam dissipates in about four to five seconds.

5. The method as recited in claim 1, wherein the nutritional elements are consisting of various nutrient packages specifically designed for a particular vegetative target.

6. The method as recited in claim 5, wherein the vegetative target is selected from the group consisting of flowers, turf and vegetables.

* * * * *